United States Patent
Autenrieth et al.

(10) Patent No.: US 6,264,856 B1
(45) Date of Patent: Jul. 24, 2001

(54) THREE-STEP REFORMING REACTOR ESPECIALLY FOR MOBILE FUEL CELL

(75) Inventors: Rainer Autenrieth, Erbach; Josef Haenfling, Markdorf; Dietmar Heil, Schwendi; Heinz Steinke, Aichwald; Norbert Wiesheu, Guenzburg, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/475,275

(22) Filed: Dec. 30, 1999

Related U.S. Application Data

(62) Division of application No. 08/879,034, filed on Jun. 19, 1997, now abandoned.

(30) Foreign Application Priority Data

Jun. 19, 1996 (DE) ............................................. 196 24 433

(51) Int. Cl.$^7$ ................ C01B 3/02; C01B 3/26; C07C 1/02
(52) U.S. Cl. ............ 252/373; 423/648.1; 423/651; 423/652
(58) Field of Search .................. 422/191, 200; 423/648.1, 650, 651, 652; 252/373

(56) References Cited

U.S. PATENT DOCUMENTS

| | | | |
|---|---|---|---|
| 2,425,625 | * 8/1947 | Larson | 423/648.1 |
| 2,443,423 | * 6/1948 | Helmers | 422/200 |
| 3,522,019 | 7/1970 | Buswell et al. | 422/190 |
| 4,551,325 | * 11/1985 | Alessandrini et al. | 422/197 |
| 4,840,783 | * 6/1989 | Quang et al. | 423/648.1 |
| 4,946,667 | * 8/1990 | Beshty | 423/648.1 |
| 5,248,566 | 9/1993 | Kumar et al. | 429/19 |
| 5,401,589 | 3/1995 | Palmer et al. | 429/13 |

FOREIGN PATENT DOCUMENTS

981875 * 1/1976 (CA).
0 634 54 08 12/1994 (JP).

OTHER PUBLICATIONS

Search Report Mar. 2, 1998 Europe.
Patent Abstracts of Japan, vol. 014, No. 302, Jun. 1990, JP 02 098064A.
Patent Abstracts of Japan, vol. 095, No. 003, Apr. 28, 1995, JP 06 345408A.

* cited by examiner

*Primary Examiner*—Wayne Langel
(74) *Attorney, Agent, or Firm*—Evenson, McKeown, Edwards & Lenahan, P.L.L.C.

(57) ABSTRACT

A reforming reactor, particularly for the water vapor reforming of methanol, with three serially arranged reactor steps, each of which is charged with a catalyst pellet fill. According to the invention, the center reactor step is maintained at a temperature which is suitable for the reforming reaction, while the two other reactor steps remain unheated. The present invention may be used as a reforming reactor for the water vapor reforming of methanol for the purpose of producing hydrogen in a fuel-cell operated motor vehicle.

7 Claims, 1 Drawing Sheet

THREE-STEP REFORMING REACTOR ESPECIALLY FOR MOBILE FUEL CELL

This application is a division of application Ser. No. 08/879,034, filed Jun. 19, 1997, now abandoned.

BACKGROUND AND SUMMARY OF THE INVENTION

The present invention relates to a reforming reactor with three serially arranged reactor steps which are each charged with a catalyst pellet fill. Reactors of this type may be used to produce hydrogen from the water vapor reforming or partial oxidation of methanol. In a fuel-cell operated motor vehicle, such a reactor can be used to feed the fuel-cells with hydrogen.

This application claims the priority of German Patent Application No. 1 962 44 33.1-41, filed in Germany on Jun. 19, 1996, the disclosure of which is herein expressly incorporated by reference.

U.S. Pat. No. 5,248,566 (hereinafter the '566 patent) describes a reforming reactor which is suitable for use in fuelcell operated motor vehicles. In the reforming reactor disclosed in the '566 patent, the inlet-side reactor step is charged with an appropriate catalyst material designed for the partial oxidation of methanol, whereas the center reactor step is charged with another catalyst material suitable for the water vapor reforming of methanol. The outlet-side reactor step is designed to convert carbon monoxide into carbon dioxide. The heat required to implement the endothermal water vapor reforming reaction in the center reactor step is generated by the inlet-side reactor step by the exothermal partial oxidation of methanol and is charged with the reaction gas into the center reactor step.

In U.S. Pat. No. 5,401,589 (hereinafter the '589 patent), a three-step reforming reactor for the water vapor reforming of methanol is disclosed, wherein the reforming reactor has a reaction space which is filled with a continuous catalyst pellet fill and which is divided into three reactor steps arranged one below the other. According to the '589 patent, each reactor step is maintained at a different temperature. More specifically, the inlet-side reactor step arranged on top is maintained at approximately 300° C., the center reactor step is maintained at approximately 275° C., and the outlet-side reactor step is maintained at approximately 225° C. The three reactor steps are heated with a heat conductive separating wall such that the reactor steps are in thermal contact with a common heating space through different contact surfaces.

U.S. Pat. No. 3,522,019 (hereinafter the '019 patent) discloses a reforming reactor with three serially arranged reactor steps which are separate from one another and which are each charged with a suitable catalyst fill. In the '019 patent, an inlet-side reactor step acts as a preliminary reactor and is heated to a temperature of approximately 370° C. to 650° C. The preliminary reactor has a heat exchange conduit which feeds hot reaction gas from the center reactor step into the preliminary reactor to thereby heat the corresponding reaction space. Another heat exchange conduit extends from a burner to the center reactor step and heats the corresponding reaction space. An outlet-side reactor step acts as a shift conversion reactor for the exothermal conversion of carbon monoxide to carbon dioxide, wherein the shift conversion reactor heats a hydrogen purifier which has a membrane which is selectively permeable to hydrogen.

Published Japanese Patent Application JP 0 634 54 08 A discloses a reforming reactor with a stacked layer construction wherein a hydrogen discharge space is flanked on each side parallel to the stacking direction by a hydrogen permeable membrane whose other side is adjacent to one reforming catalyst reaction layer respectively. Raw hydrocarbon material and vapor are fed to the reforming catalyst reaction layer-perpendicular to the stacking direction to carry out the desired reforming reaction. On the side opposite the hydrogen discharge space, the reforming reaction layers are each adjacent to one combustion catalyst layer respectively, to which hydrocarbon fuel and air are fed perpendicular to the stacking direction. The resulting exothermal oxidation reaction heats the respective adjoining reforming reaction layers.

An object of the present invention is to provide a three-step reforming reactor which can be implemented at relatively low cost and which is particularly suitable for mobile applications.

This and other objects are achieved according to the present invention by a reforming reactor, particularly for the water vapor reforming of methanol, comprising three serially arranged reactor steps, i.e. an inlet-side reactor step, a center reactor step and an outlet-side reactor step, each of which is charged with a catalyst pellet fill, wherein the center reactor step is heated at a temperature which is suitable for carrying out the reforming reaction, while the two other reactor steps remain unheated.

According to the present invention, the inlet-side reactor step is unheated but its corresponding reaction space, as well as the reaction space of the other two reactor steps, are charged with a suitable catalyst pellet fill. The inlet-side reactor step is therefore used as a filter to filter out floating particles as well as water drops or methanol drops, which prevents damage to the catalyst material in the center reactor step. In addition, the inlet-side reactor step carries out a partial conversion of the reforming reaction, which relieves the center reactor step. Furthermore, temperature fluctuations of the educt gas caused by load changes, which are common in mobile uses such as in motor vehicles, are dampened by the heat capacity of the inlet-side reactor step and by cooling the entering hot gas flow because of the partial endothermal conversion reaction.

As a result of the unheated outlet-side reactor step, it is possible to convert carbon monoxide to carbon dioxide in order to minimize the carbon monoxide content, which is particularly desirable for subsequent use of the reformed gas in a fuel-cell arrangement. Additionally, as a result of the heat capacity of the outlet-side reactor step, temperature fluctuations in the center reactor step occurring because of load changes, are further dampened. As a result, only comparatively slight fluctuations of the carbon monoxide content and the outlet gas temperature occurs during load changes.

The actual reforming reaction is carried out in the center reactor step and, because of the carbon monoxide conversion occurring in the outlet-side reactor step, can be operated at higher temperatures and with larger temperature fluctuations.

Therefore, for a given reforming capacity requirement, the reforming reactor of the present invention permits a simple and compact reactor construction, wherein the reactor is relatively insensitive to temperature fluctuations occurring as a result of load changes.

In a preferred embodiment, the three reactor steps of the reforming reactor are formed by superimposed sections of a reaction space which is filled with a continuous catalyst pellet fill, wherein only the center reactor step of the reaction space is in thermal contact with a heating space.

The continuous catalyst pellet fill of the reaction space permits automatic filling of the center reactor step with material from the inlet-side reactor step, which is situated above it, when the catalyst pellet fill exhibits settling caused by jolts occurring in mobile applications in motor vehicles for example. In this preferred embodiment, diagonal installation of the reforming reactor in the vehicle is also possible without disturbing the automatic filling function.

In certain preferred embodiments, the center reactor step, which carries out the reforming reaction, is constructed as a reactor tube bundle wherein tubes extend from the top inlet-side reactor step, which operates as a distributor space, through an intermediate heating space to the bottom outlet-side reactor step, which operates as a collection space.

In certain other preferred embodiments, the center reactor step has a heating space which is constructed as a heating tube bundle with tubes extending transversely through the center reactor step.

Other objects, advantages and novel features of the present invention will become apparent from the following detailed description of the invention when considered in conjunction with the accompanying drawings.

DETAILED DESCRIPTION OF THE INVENTION

Figure 1:
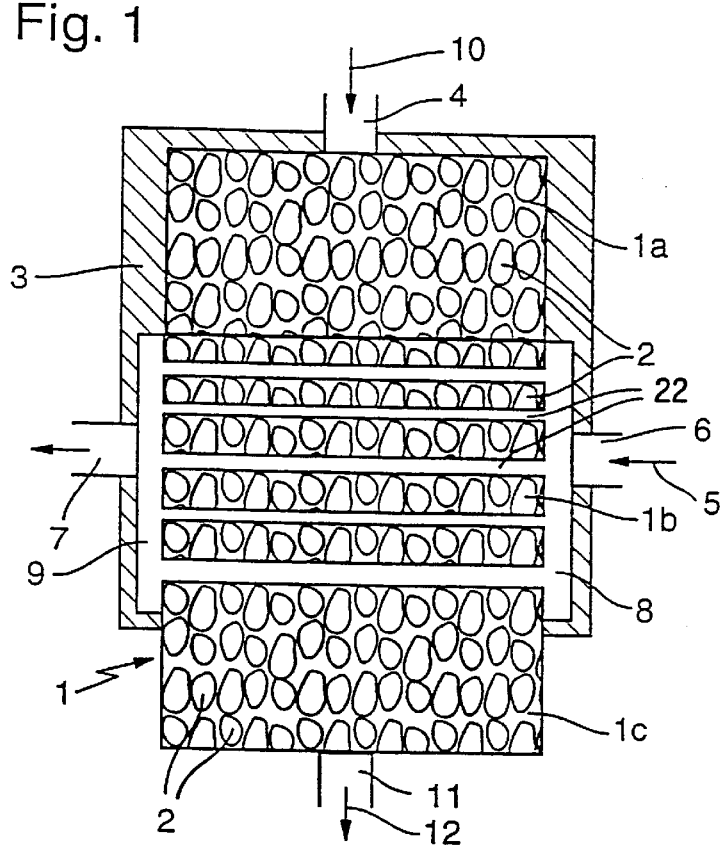
FIG. 1 is a longitudinal sectional view of the reaction space of a three-step reforming reactor for the water vapor reforming of methanol, wherein the center reactor step is penetrated by a heating tube bundle, constructed according to a preferred embodiment of the present invention.

The three-step reforming reactor for the water vapor reforming of methanol illustrated in FIG. 1 contains three reactor steps 1a, 1b, 1c which are formed by three sections of a reaction space 1, wherein the three reactor steps are arranged one above the other and the reaction space is filled with a suitable catalyst fill 2. A $CuO/ZnO/Al_2O_3$ material may be used as the catalyst material. The upper inlet-side reactor step and the center reactor step, 1a and 1b respectively, are surrounded by a thermally insulating housing 3 which has a gas inlet 4 on the top side so that the upper reactor step 1a acts as an inlet-side reactor step.

A heating device connected to the center reactor step 1b, contains a heating tube bundle 22 which extends transversely through the center section 1b of the reaction space 1, through which a heating fluid 5 can be fed. For this purpose, the surrounding housing 3 is provided with a lateral heating fluid inlet 6 and an opposite heating fluid outlet 7. In order to distribute the heating fluid 5 to the individual tubes of the heating tube bundle 22, the housing 3 has an interior side lateral recess 8 which acts as a heating fluid distribution space and, on the opposite interior side, an analogous recess 9 which acts as a heating fluid collection space. As a result, the center reactor step 1b may maintained at a temperature in the range of between about 280° C. and 350° C., for example, which is optimal for the reforming reaction. In contrast, the inlet-side reactor step 1a and the outlet-side reactor step 1c remain unheated. Additionally, as the outlet-side reactor step 1c is arranged outside the thermally insulating housing 3, it can be cooled with ambient air.

The tubes of the heating tube bundle 22 have a certain diameter and spacing from one another such that uniform heating of the center reactor step 1b is achieved, and so that the individual pellets of the catalyst pellet fill 2 can move downward between the tubes when settling of the pellet fill 2 occurs. Such settling may be caused by an initially loose pellet fill in the reaction space, as well as by the abrasion of the pellets against one another and by the breaking of individual pellets because of jolts as commonly occur during use in mobile applications in motor vehicles. When such settling occurs, the fact that the reaction space 1 is filled with the catalyst pellet material permits the catalyst material which is deposited from the center reactor step 1b in the lower reactor step 1c to be replaced by catalyst material which follows from the upper rector step 1a into the center reactor step 1b. This causes automatic filling of the center reactor step 1b, even in cases where the reforming reactor is installed diagonally in a motor vehicle.

According to the embodiment shown in FIG. 1, a hot gas mixture 10 which is to be reformed, enters from above the inlet-side reactor step 1a, where a partial reformation occurs. As a result, the water vapor and the methanol concentration is already slightly reduced when the gas mixture enters the center reactor step 1b. As a result, the center reactor step 1b can be relatively small and compact, and aging of the catalyst caused by methanol and hydrogen is reduced. The inlet-side reactor step 1a also simultaneously filters out floating particles so that a hot gas filter is not necessary before the center reactor step 1b. Likewise, water and methanol drops are filtered out by the inlet-side reactor step 1a, which prevents damage to the catalyst material in the center reactor step 1b and also minimizes aging of the catalyst. In addition, the present invention does not require the absence of dripping in the educt gas flow, which simplifies the construction of an evaporator arranged in front of the reaction space gas inlet 4. As a result of the heat capacity of the inlet-side reactor step 1a and the cooling of the hot gas mixture 10 caused by the partial endothermal methanol conversion, temperature fluctuations of the educt gas which occur during load changes are dampened.

In the heated center reactor step 1b, the principal methanol conversion will then take place by water vapor reforming. In this case, because of the subsequent outlet-side reactor step 1c, minimal carbon monoxide content is not necessary. Instead, the center reactor step 1b can be operated at a relatively high temperature and with comparatively large temperature fluctuations. For a given reforming capacity requirement, this permits a relatively small volume design for the center reactor step 1b.

In the unheated, air cooled outlet-side reaction step 1c, the carbon monoxide content of the reformed gas mixture is reduced by conversion into carbon dioxide at a temperature of less than 280° C. The heat capacity of the outlet-side reactor step 1c causes a further dampening of the temperature fluctuations which occur in the center reactor step 1b during load changes. The gas flow 12, which flows out of a gas outlet 11 from the outlet-side reactor step 1c, therefore, under different load conditions, has a high concentration of formed hydrogen and simultaneously, a low carbon monoxide concentration. Therefore, this gas flow 12 can be used, for example, for feeding fuel-cells in a motor vehicle.

Figure 2:
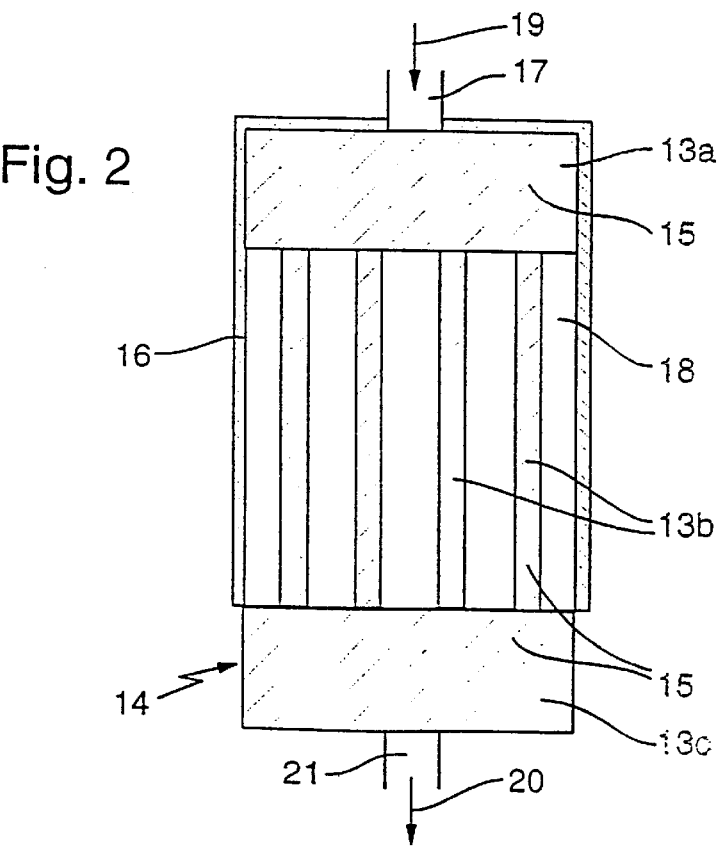
FIG. 2 is a longitudinal sectional view of the reaction space of a three-step reforming reactor for the water vapor reforming of methanol, wherein the center reactor step is constructed as a tube bundle,-constructed according to another preferred embodiment of the present invention.

FIG. 2 illustrates part of another reforming reactor which also contains three serially arranged reactor steps 13a, 13b, 13c, which are formed by three sections of a reaction space 14, and are arranged one above the other, wherein the reaction space 14 is filled with a catalyst pellet fill 15 (indicated by the shading), such as a $CuO/ZnO/Al_2O_3$ material for example. As in the embodiment of FIG. 1, the upper inlet-side reactor step 13a and the center reactor step 13b are surrounded by a thermally insulating housing 16 which has a gas inlet 17 on the top side, while the lower outlet-side reactor step 13c is in a heat exchange conduit with the ambient air.

An important difference between the reactor of FIG. 1 and the reactor of FIG. 2, is that in FIG. 2, the center reactor step 13b is a reactor tube bundle with tubes extending from the upper inlet-side reactor step. 13a to the lower outlet-side reactor step 13c. The space which surrounds the tubes between the inlet-side reactor step 13a and the outlet-side reactor step 13c is enclosed by the thermally insulating housing 16 and acts as a heating space 18 through which a heating fluid is fed from a heating fluid inlet to a heating fluid outlet (not shown) to heat the reactor tube bundle 13b.

In the reforming reactor shown in FIG. 2, a water vapor/methanol gas mixture 19 is reformed to produce a reaction gas 20 from the respective outlet 21 of the outlet-side reactor step 13c which has a high hydrogen concentration and a very low carbon monoxide content. It should be noted in this respect, that the tubes of the reactor bundle 13b have sufficient width in comparison to the typical diameter of the catalyst pellets so that, in the event of settling of the continuous catalyst pellet fill 15 in the reaction space 14, catalyst material can flow from the upper inlet-side reaction step 13a into the tubes of the center reactor step 13b. As in FIG. 1, this always ensures complete filling of the center reactor step 13b with catalyst material, as the center reactor step 13b is mainly responsible for the reforming reaction.

The two described preferred embodiments demonstrate that the reforming reactors of the present invention can have a simple and compact construction, are very insensitive to temperature fluctuations during load changes, and when used in motor vehicles, are insensitive to jolts and diagonal mounting in the vehicle. It is understood that reforming reactors according to the present invention are also suitable for other reforming reactions, in addition to the water vapor reforming of methanol, depending on the selection of the catalyst material and the temperature of the heated center reactor step.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of reforming a gas mixture, comprising:

feeding a gas mixture into an inlet-side reactor section of a reforming reactor comprising a catalyst;

partially reforming the gas mixture endothermally;

heating a center reactor section of the reforming reactor comprising the catalyst by passing a heating fluid through a heating device comprising a tube bundle extending transversely through the center reactor section;

feeding the partially-reformed gas mixture into the center reactor section, thereby further reforming the gas mixture endothermally; and feeding the further-reformed gas mixture into an outlet-side reactor section of the reforming reactor comprising the catalyst, wherein the reactor sections form a continuous catalyst pellet fill in the reactor, and wherein the inlet-side reactor section and the outlet-side reactor section are unheated.

2. The method according to claim 1, wherein the three reactor sections are superimposed.

3. A method of reforming a gas mixture, comprising:

feeding a gas mixture into an inlet-side reactor section of a reforming reactor comprising a catalyst;

partially reforming the gas mixture endothermally;

heating a center reactor section of the reforming reactor comprising the catalyst;

feeding the Partially-reformed gas mixture into the center reactor section, thereby further reforming the gas mixture endothermally; and feeding the further-reformed gas mixture into an outlet-side reactor section of the reforming reactor comprising the catalyst, wherein the reactor sections form a continuous catalyst pellet fill in the reactor, wherein the inlet-side reactor section and the outlet-side reactor section are unheated and, wherein the center reactor section comprises tubes that extend from the inlet-side reactor section to the outlet-side reactor section.

4. The method according to claim 1, wherein the reforming is the water vapor reforming of methanol.

5. The method according to claim 1, wherein said heating is to a temperature of between about 280° C. and 350° C.

6. A method of reforming a gas mixture, comprising:

feeding a gas mixture into an inlet-side reactor section of a reforming reactor comprising a catalyst;

partially reforming the gas mixture endothermally;

heating a center reactor section of the reforming reactor comprising the catalyst;

feeding the partially-reformed gas mixture into the center reactor section, thereby further reforming the gas mixture endothermally; and feeding the further-reformed gas mixture into an outlet-side reactor section of the reforming reactor comprising the catalyst, wherein the reactor sections form a continuous catalyst pellet fill in the reactor, wherein the inlet-side reactor section and the outlet-side reactor section are unheated and, wherein the inlet-side reactor section and the center reactor section are in a thermally-insulated housing.

7. A method of reforming a gas mixture, comprising:

feeding a water vapor and methanol gas mixture into an inlet-side reactor section of a reforming reactor comprising a catalyst;

partially reforming the gas mixture endothermally;

heating a center reactor section of the reforming reactor comprising the catalyst by passing a heating fluid through a heating device comprising a tube bundle extending transversely through the center reactor section;

feeding the partially-reformed gas mixture into the center reactor section, thereby further reforming the gas mixture endothermally and forming a further-reformed gas mixture containing carbon monoxide; and feeding the further-reformed gas mixture into an outlet-side reactor section of the reforming reactor comprising the catalyst, thereby reducing the carbon monoxide to carbon dioxide, wherein the reactor sections form a continuous catalyst pellet fill in the reactor, and wherein the inlet-side reactor section and the outlet-side reactor section are unheated.

\* \* \* \* \*